(12) United States Patent
Dong et al.

(10) Patent No.: US 12,314,310 B2
(45) Date of Patent: May 27, 2025

(54) INFORMATION PROCESSING APPARATUS, DISPLAY METHOD, AND NON-TRANSITORY COMPUTER-READABLE MEDIUM STORING PROGRAM

(71) Applicant: NEC Corporation, Tokyo (JP)

(72) Inventors: Tingting Dong, Tokyo (JP); Jianquan Liu, Tokyo (JP); Daisuke Sugidomari, Tokyo (JP); Taisuke Shimada, Tokyo (JP); Yusuke Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/275,123

(22) PCT Filed: Jul. 14, 2021

(86) PCT No.: PCT/JP2021/026451
§ 371 (c)(1),
(2) Date: Jul. 31, 2023

(87) PCT Pub. No.: WO2023/286202
PCT Pub. Date: Jan. 19, 2023

(65) Prior Publication Data
US 2024/0061876 A1 Feb. 22, 2024

(51) Int. Cl.
*G06F 16/538* (2019.01)
*G06F 16/55* (2019.01)
(Continued)

(52) U.S. Cl.
CPC ............ *G06F 16/538* (2019.01); *G06F 16/55* (2019.01); *G06V 20/52* (2022.01); *G06V 40/10* (2022.01)

(58) Field of Classification Search
CPC ....... G06F 16/538; G06F 16/55; G06V 20/52; G06V 40/10; G06V 40/103; H04N 7/18
See application file for complete search history.

(56) References Cited

U.S. PATENT DOCUMENTS

| 2013/0212119 A1 | 8/2013 | Yamamoto | |
| 2013/0236065 A1* | 9/2013 | Wang | G06F 16/583 382/111 |

(Continued)

FOREIGN PATENT DOCUMENTS

| JP | 2018-142160 A | 9/2018 |
| JP | 2020-042684 A | 3/2020 |

(Continued)

OTHER PUBLICATIONS

International Search Report for PCT Application No. PCT/JP2021/026451, mailed on Oct. 12, 2021.

*Primary Examiner* — Charles Rones
*Assistant Examiner* — Xiaoqin Hu
(74) *Attorney, Agent, or Firm* — Sughrue Mion, PLLC

(57) ABSTRACT

An information processing apparatus capable of improving accuracy of search results. The information processing apparatus includes: a management unit that manages at least one object, an attribute by which the object is classified, and a certainty factor indicating a probability that the object has the attribute in association with each other; a calculation unit that, using a certainty factor of an attribute designated as a search condition and a certainty factor being managed in association with an attribute identical or similar to the attribute designated as the search condition, calculates a score indicating a matching degree of the object with the search condition; and a display unit that displays the object based on the calculated score.

11 Claims, 11 Drawing Sheets

(51) Int. Cl.
 *G06V 20/52* (2022.01)
 *G06V 40/10* (2022.01)

(56) References Cited

U.S. PATENT DOCUMENTS

2018/0307706 A1* 10/2018 Xiao ...................... G06F 16/51
2020/0065324 A1* 2/2020 Watanabe ............. G06F 16/532
2020/0089703 A1 3/2020 Yamaji et al.
2021/0311984 A1* 10/2021 Saito ................. G06F 18/24323
2022/0261454 A1 8/2022 Dong

FOREIGN PATENT DOCUMENTS

| JP | 2020-198053 | A | 12/2020 |
| JP | 2021-043774 | A | 3/2021 |
| WO | 2012/066760 | A1 | 5/2012 |
| WO | 2020/255307 | A1 | 12/2020 |
| WO | 2021/059493 | A1 | 4/2021 |

* cited by examiner

| PERSON | GENDER | AGE | CLOTHING COLOR | EYEGLASSES |
|---|---|---|---|---|
| h_1 | MALE、0.7 | THIRTIES、0.8 | DARK RED、0.9 | No、0.9 |
| h_2 | FEMALE、0.9 | THIRTIES、0.6 | DEEP RED、0.9 | No、0.9 |
| h_3 | MALE、0.9 | FORTIES、0.8 | NUT BROWN、0.7 | Yes、0.9 |
| h_4 | MALE、0.8 | FIFTIES、0.8 | DEEP BLUE、0.6 | No、0.6 |

| | | | |
|---|---|---|---|
| NUMBER OF ATTRIBUTES | 3 | 5 | 5 OR MORE |
| GENDER : MALE | 0.6 | 0.6 | 0.6 |
| AGE : THIRTIES | 0.6 | 0.6 | 0.6 |
| CLOTHING COLOR : RED | 0.6 | 0.6 | 0.6 |
| EYEGLASSES : No | — | 0.6 | 0.6 |
| HAT : Yes | — | 0.6 | 0.6 |
| SHOE COLOR : WHITE | — | — | 0.6 |

INFORMATION PROCESSING APPARATUS, DISPLAY METHOD, AND NON-TRANSITORY COMPUTER-READABLE MEDIUM STORING PROGRAM

This application is a National Stage Entry of PCT/JP2021/026451 filed on Jul. 14, 2021, the contents of all of which are incorporated herein by reference, in their entirety.

TECHNICAL FIELD

The present disclosure relates to an information processing apparatus, a display method, and a program.

BACKGROUND ART

In recent years, surveillance cameras have been installed in various places as surveillance cameras have been widely adopted. Videos taken by surveillance cameras are used, for example, in investigations of various incidents, or the like. Specifically, the police may often investigate a suspicious person using target information of a certain suspicious person from a huge number of videos.

Patent Literature 1 discloses a configuration of an information processing apparatus that searches for a target person according to search conditions for which attributes are designated in categories of gender, hair color, clothing color, and the like. The information processing apparatus disclosed in Patent Literature 1 designates not only a search condition for which an attribute is designated, but also a certainty factor representing the likelihood that the search conditions are satisfied, and displays a person who satisfies the search condition and the certainty factor. For example, when male is designated as an attribute and a certainty factor is designated to be 90%, the information processing apparatus displays, as a search result, a person with a certainty factor of 90% or greater about being classified as "male". In other words, the information processing apparatus does not display a person with a certainty factor of less than 90% about being classified as "male".

CITATION LIST

Patent Literature

Patent Literature 1: International Patent Publication No. 2020/255307

SUMMARY OF INVENTION

Technical Problem

The information processing apparatus disclosed in Patent Literature 1 uses a certainty factor of each of attributes to narrow down search results to be displayed. For this reason, for example, the persons displayed as having a certainty factor of 90% or greater about being classified as "male" designated as an attitude may include persons who does not clearly satisfy a certainty factor of an attitude designated for hair color, clothing color, or the like. Since the persons displayed as the search results may include persons different from the person as a search target in this way, it is desirable to improve accuracy of the search results in order to find the search target early.

One object of the present disclosure is to provide an information processing apparatus, a display method, and a program that can improve accuracy of search results.

Solution to Problem

A first aspect of the present disclosure provides an information processing apparatus including: a management unit that manages at least one object, an attribute by which the object is classified, and a certainty factor indicating a probability that the object has the attribute in association with each other; a calculation unit that, using a certainty factor of an attribute designated as a search condition and a certainty factor being managed in association with an attribute identical or similar to the attribute designated as the search condition, calculates a score indicating a matching degree of the object with the search condition; and a display unit that displays the object based on the calculated score.

A second aspect according to the present disclosure provides a display method including: managing at least one object, an attribute by which the object is classified, and a certainty factor indicating a probability that the object has the attribute in association with each other; using a certainty factor of an attribute designated as a search condition and a certainty factor being managed in association with an attribute identical or similar to the attribute designated as the search condition, thereby calculating a score indicating a matching degree of the object with the search condition; and displaying the object based on the calculated score.

A third aspect according to the present disclosure provides a program that causes a computer to execute: managing at least one object, an attribute by which the object is classified, and a certainty factor indicating a probability that the object has the attribute in association with each other; using a certainty factor of an attribute designated as a search condition and a certainty factor being managed in association with an attribute identical or similar to the attribute designated as the search condition, thereby calculating a score indicating a matching degree of the object with the search condition; and displaying the object based on the calculated score.

Advantageous Effects of Invention

According to the present disclosure, it is possible to provide an information processing apparatus, a display method, and a program that can improve accuracy of search results.

BRIEF DESCRIPTION OF DRAWINGS

FIG. 3 is a diagram showing data managed by a management unit according to the second example embodiment;

FIG. 6 is a diagram for explaining a total certainty factor according to the second example embodiment;

EXAMPLE EMBODIMENTS

First Example Embodiment

Figure 1:
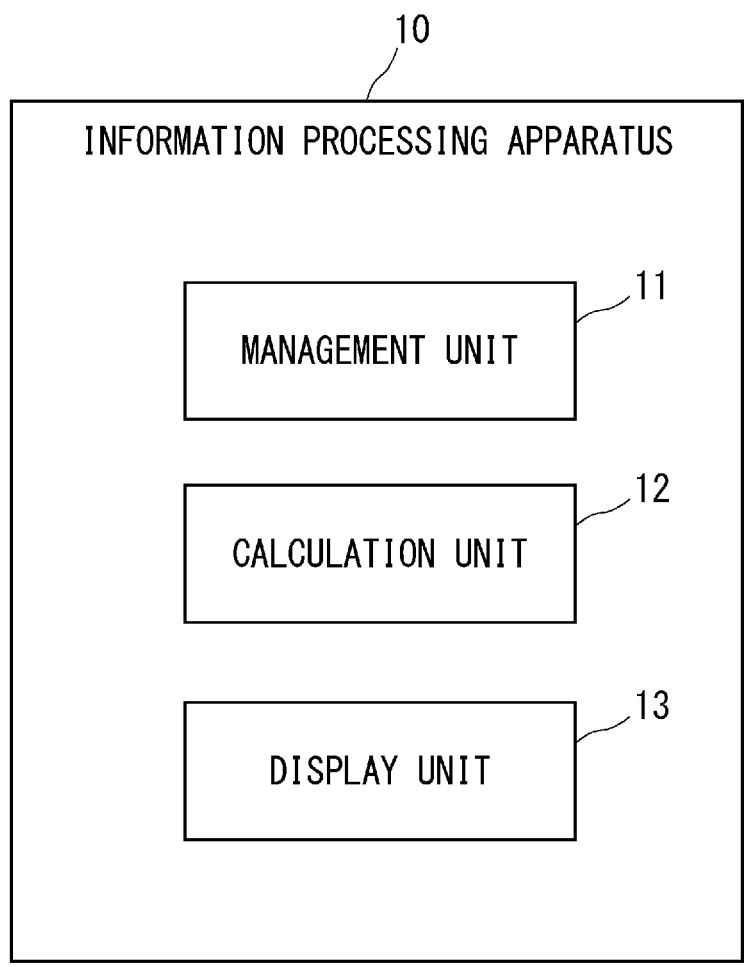
FIG. 1 is a configuration diagram of an information processing apparatus according to a first example embodiment.

Example embodiments of the present disclosure will be described below with reference to the drawings. A configuration example of an information processing apparatus 10 according to a first example embodiment will be described with reference to FIG. 1. The information processing apparatus 10 may be a computer apparatus that is operated by a processor executing a program stored in a memory.

The information processing apparatus 10 includes a management unit 11, a calculation unit 12, and a display unit 13. The management unit 11, the calculation unit 12, and the display unit 13 may be software or modules in which processing is performed by a processor executing the program stored in the memory. Alternatively, the management unit 11, the calculation unit 12, and the display unit 13 may be hardware such as circuit, chips, or the like.

The management unit 11 manages at least one object, an attribute by which the object is classified, and a certainty factor indicating a probability that the object has the attribute, in association with each other. The object may be a person, an animal, a building, and a structure, and the like. Alternatively, the object may be a means of transportation such as a vehicle, a bicycle, or a train.

Attributes by which objects are classified may be natures classified within categories of gender, age, clothing color, or the like. For example, in the category of gender, male and female may be used as attributes. In the category of age, generations may be used as attributes, for example, teens, twenties, and thirties, or age may be used as an attribute. In the category of clothing color, colors of red, blue, yellow, or the like may be used. In the category of clothing color, colors of dark red, deep red, or the like may be used which are obtained by further classification of the same colors, for example.

The certainty factor indicates the probability that the object has the attribute, or to put it another way, the certainty factor indicates the likelihood that the object is a designated attribute. The certainty factor may be indicated as, for example, a unit in percentage (%), or may be indicated using a decimal of 0 or greater and 1 or less. When the certainty factor is indicated using a decimal of 0 or greater and 1 or less, the certainty factor becomes higher as the value increases.

The management unit 11 may hold a database in which the attribute by which the object is classified is associated with the certainty factor that indicates the probability that the object has the attribute.

The calculation unit 12 uses a certainty factor of an attribute designated as a search condition and a certainty factor managed in association with an attribute that is identical or similar to the attribute designated as the search condition, and calculates a score indicating a matching degree of the object with the search condition. The search condition may be input from a user of the information processing apparatus 10, or the like, for example. Alternatively, the search condition may be input from another computer apparatus to the information processing apparatus 10 via a network. Alternatively, the information processing apparatus 10 may determine the search condition by analyzing voice, text, or images, for example.

The management unit 11 manages the certainty factor associated with an attribute that is identical or similar to the attribute designated as the search condition. In other words, the calculation unit 12 uses the attribute designated as the search condition to extract the certainty factor associated with an attribute that is identical or similar to the attribute designated as the search condition, from the database held by the management unit 11.

As for the score indicating the matching degree of the object with the search condition, the matching degree of the object with the search condition becomes higher as the value increases. For example, when a plurality of attributes and certainty factors thereof are designated as search conditions, the calculation unit 12 may calculate a total score for the object by totalizing score values calculated for each attribute. In other words, the score for an object is a value obtained by considering or combining a plurality of attributes.

The display unit 13 may display a predetermined number of objects in descending order of score, for example. Alternatively, the display unit 13 may display objects whose score exceeds a predetermined score threshold.

As described above, the information processing apparatus 10 displays objects having a high matching degree with the search condition as search results. Thus, the user of the information processing apparatus 10 can easily specify a desired object from the search results displayed on the information processing apparatus 10.

In FIG. 1, the configuration has been described in which the management unit 11 is included in the information processing apparatus 10, but the management unit 11 may be included in an apparatus different from the information processing apparatus 10. In this case, the calculation unit 12 of the information processing apparatus 10 may acquire information managed by the management unit 11 included in another apparatus, via the network.

Second Example Embodiment

Figure 2:
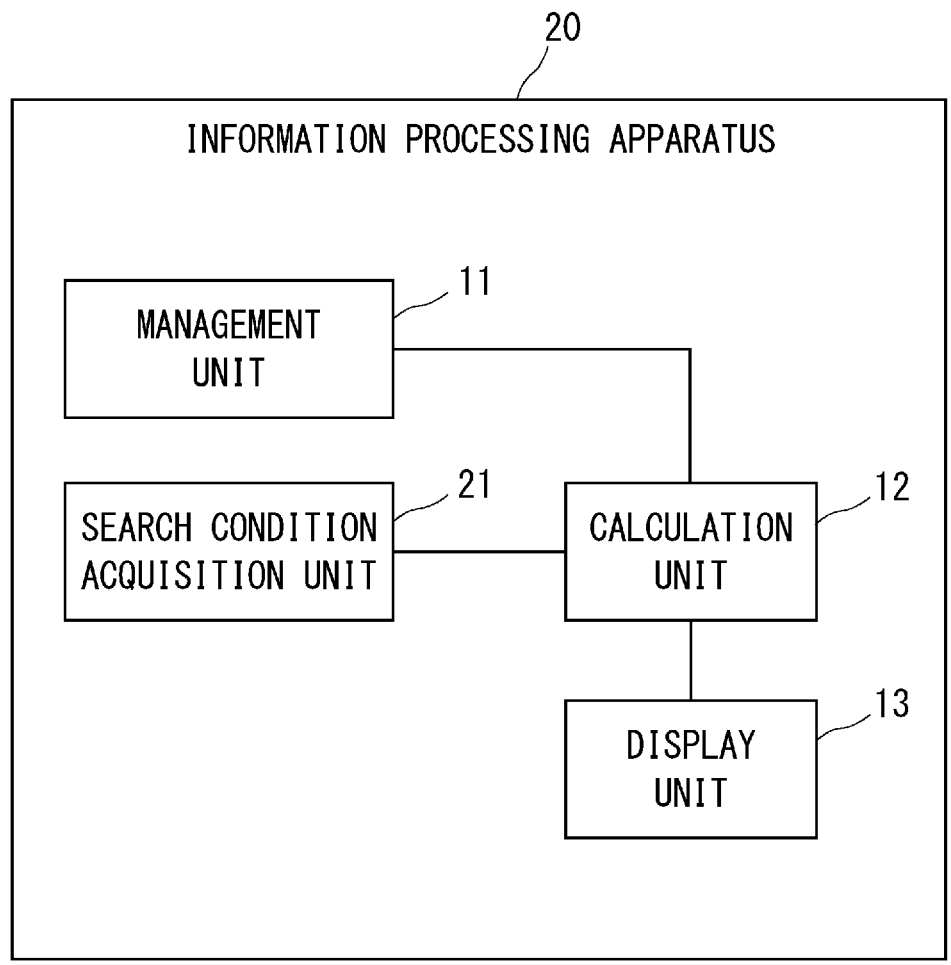
FIG. 2 is a configuration diagram of an information processing apparatus according to a second example embodiment.

Subsequently, a configuration example of an information processing apparatus 20 according to a second example embodiment will be described with reference to FIG. 2. The information processing apparatus 20 has a configuration in which a search condition acquisition unit 21 is added to the information processing apparatus 10. A management unit 11, a calculation unit 12, and a display unit 13 constituting the information processing apparatus 20 are the same as those of the information processing apparatus 10, and thus will not be described in detail. In the following, a description will be given with respect to functions and operations, or the like of the information processing apparatus 20 different from those of the information processing apparatus 10 or detailed functions and operations, or the like of the information processing apparatus 20 and the information processing apparatus 10.

The search condition acquisition unit 21 acquires search conditions. The search condition acquisition unit 21 may acquire search conditions input via an input interface, or the like from a user of the information processing apparatus 20, for example. The user may input text or voice using, for example, a keyboard, a touch panel, or a microphone, or the like to input attributes and certainty factors. For example, when the user inputs search conditions, an eyewitness of a person being searched may determine a certainty factor, which is an attribute by which the person being searched is classified. In this case, the search conditions to be input are determined according to the subjectivity of the eyewitness.

Alternatively, the search condition acquisition unit 21 may specify search conditions using an input image. For example, when a search or an investigation for a certain person is performed, the user inputs image data, in which such a person appears, to the information processing apparatus 20. The search condition acquisition unit 21 may specify an attribute of the person displayed in the image and calculate a certainty factor of the attribute by executing image analysis processing or image recognition processing on the input image data.

The image analysis processing or the image recognition processing may be executed using a trained model generated for learning the attribute about the person and the certainty factor indicating the probability that the person has the attribute, using a plurality of pieces of image data, in which the person is displayed, as training data. When the input image data is applied to the generated trained model, the search condition acquisition unit 21 acquires the attribute of the person displayed in the image and the certainty factor indicating the probability that the person has the attribute.

Subsequently, data managed by the management unit 11 will be described with reference to FIG. 3. FIG. 3 shows a database in which persons are used as objects and attributes of the persons are managed. Symbols h_1 to h_4 shown in a column of persons indicate identification information for identifying persons. In a category of gender, for example, an attribute of male or female is set. In a category of age, for example, generations of thirties, forties, fifties, or the like are set. In a category of clothing color, colors of dark red, deep red, nut brown, deep blue, or the like are set. In a category of eyeglasses, Yes is set when the user is wearing eyeglasses, and No is set when the user is not wearing eyeglasses. A numerical value shown next to each of the attributes indicates a certainty factor indicating a probability that each person has the attribute. In addition, the category of clothing color may be divided into upper body clothing color, lower body clothing color, hat color, shoe color, and the like. Attributes and certainty factors may be set for the upper body clothing color, the lower body clothing color, the hat color, and the shoe color, respectively.

As shown in FIG. 3, for example, the person h_1 has a certainty factor of 0.7 that he is male, has a certainty factor of 0.8 that he is in thirties, has a certainty factor of 0.9 that he is wearing dark red clothes, and has a certainty factor of 0.9 that he is not wearing eyeglasses. Similarly for other persons, attributes and certainty factors are associated with each other. Regarding certainty factors represented using a decimal point of 1 or less, the certainty factor is higher as the value of the certainty factor increases. To put it another way, for the person h_1, the probability of being male is 70%, and the probability of being in thirties is 80%, for example.

Here, the persons h_1 to h_4 are persons appearing in the video or the like taken by a surveillance camera. For example, the management unit 11 may acquire video data taken by the surveillance camera, and specify a plurality of persons, attributes about the persons, and certainty factors of the attributes, from the video data. Specifically, in the same way as the search condition acquisition unit 21, the management unit 11 may apply the video data to the trained model to acquire the attribute of the person included in the video and the certainty factor indicating the probability that the person has the attribute. Furthermore, the management unit 11 may manage the video, in which respective persons appear, in the form of a still image or a moving image. The management unit 11 may manage the video, in which respective persons appear, and the attribute and certainty factor of each of the person appearing in the video in association with each other. Further, the management unit 11 may manage a frame image constituting the video, in which respective persons appear, and the attribute and certainty factor of each of the persons appearing in the frame image in association with each other. For example, when the person h_1 is designated, the management unit 11 may extract still image data in which the person h_1 appears.

Alternatively, analysis processing of the video data taken by the surveillance camera is executed in a computer apparatus different from the information processing apparatus 20, and an attribute of a person included in the video data and a certainty factor indicating a probability that the person has the attribute may be specified. In this case, the management unit 11 may acquire, from the computer apparatus that analyzed the video data, the attribute of the person included in the video data and the certainty factor indicating the probability that the person has the attribute, via the network. Alternatively, the user of the information processing apparatus 20 may input an analysis result of the computer apparatus, which analyzed the video data, to the information processing apparatus 20. Further, the management unit 11 may acquire the video data, in which the person appears, from the computer apparatus which analyzed the video data.

Figure 4:
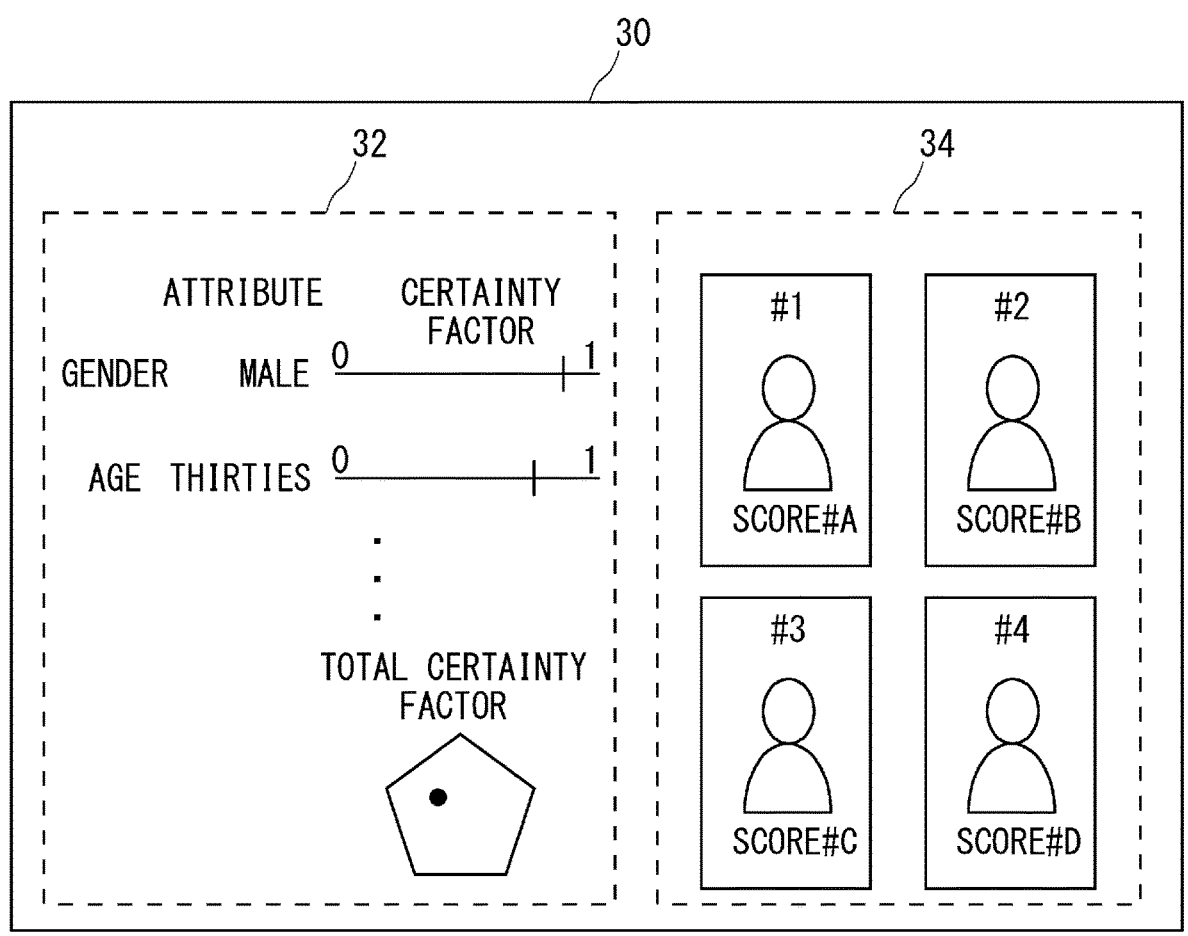
FIG. 4 is a diagram of a screen image displayed by a display unit according to the second example embodiment.

Subsequently, a screen image displayed by the display unit 13 will be described with reference to FIG. 4. FIG. 4 shows a display screen 30. The display screen 30 includes a search condition designating region 32 and a result display region 34. For example, the user of the information processing apparatus 20 sets attributes and certainty factors in the search condition designating region 32. FIG. 4 shows that the user of the information processing apparatus 20 sets a male and thirties as attributes and a certainty factor of the male and a certainty factor of the thirties are set using slide bars in which numerical values are set from 0 to 1. For example, the user sets an attribute and a certainty factor of a person to be searched according to an instruction from the eyewitness who witnessed the person to be searched. Further, when the search conditions are specified using the input image, the input image may be displayed in the search condition designating region 32. In this case, the certainty factor for each attribute is set based on the input image.

Search results based on the search conditions set in the search condition designating region 32 are displayed in the result display region 34. The result display region 34 may show the person that has been searched and a score of the person for the search conditions. Further, symbols #1 to #4 in the result display region 34 indicate ranking, and a person having the highest score for the search condition is indicated as #1.

As shown in FIG. 4, the search condition designating region 32 and the result display region 34 may be displayed simultaneously on one display screen 30. For example, when the user of the information processing apparatus 20 changed the attribute or the certainty factor in the search condition designating region 32, the ranking of the persons displayed in the result display region 34 fluctuates according to the change operation. When the search condition designating region 32 and the result display region 34 are displayed simultaneously in this way, the user of the information processing apparatus 20 can easily confirm the ranking of the persons, which fluctuates according to the change in the search condition, in the result display region 34. In addition, when there are many persons to be displayed in the result display region 34, all persons to be displayed may be displayed by a scroll operation, or the like.

Figure 5:
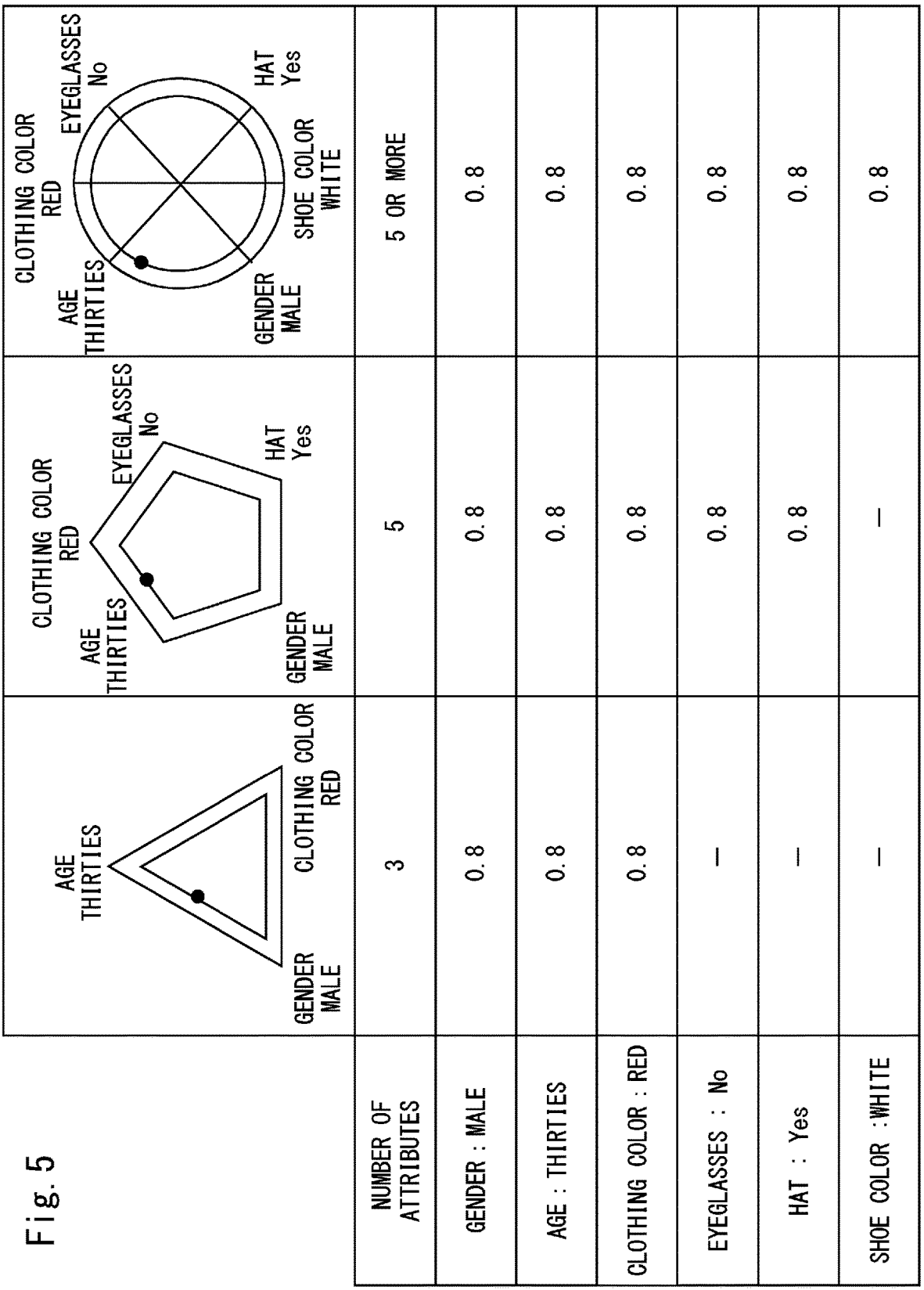
FIG. 5 is a diagram for explaining a total certainty factor according to the second example embodiment.
Figure 7:
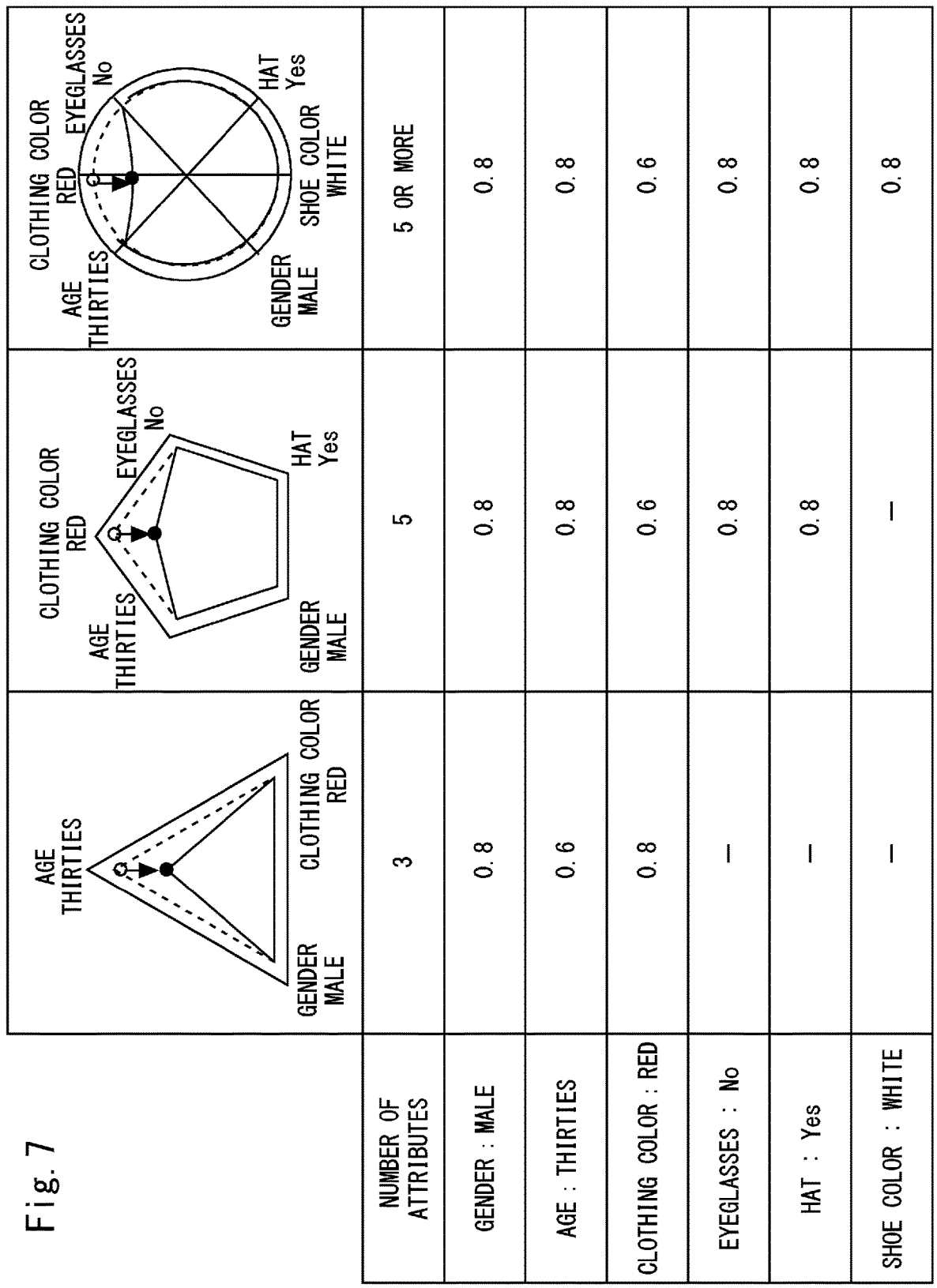
FIG. 7 is a diagram for explaining a total certainty factor according to the second example embodiment.

Furthermore, the certainty factors of all attributes may be collectively set using a slide bar (not shown) of a total certainty factor. For example, when 0.8 is designated in the slide bar of the total certainty factor, the certainty factors of all attributes may be set to be 0.8. Alternatively, as shown in FIG. 4, the total certainty factor may be set in a form of polygon or circle. Here, an example of setting the total certainty factor in a form of polygon or circle will be described with reference to FIGS. 5 to 7. FIGS. 5 to 7 shows variations of forms used for setting the total certainty factor. For example, a triangle, a pentagon, or a circle may be used to set the total certainty factor as shown in FIGS. 5 to 7. Vertices of the triangle and the pentagon are associated with attributes. Points associated with attributes are also shown on a circumference of the circular. When the number of attributes to be set is three, the total certainty factor may be set in a form of triangle. When the number of attributes to be set is five, the total certainty factor may be set in a form of pentagon. When the number of attributes to be set is five or more, the total certainty factor may be set in a form of circle. Alternatively, when the number of attributes to be set is four, a rectangle may be used, and a polygon to be used may be determined according to the number of attributes to be set.

FIG. 5 shows that the total certainty factor is set to be 0.8 and the certainty factor of each of the attributes is set to be 0.8. The form of the same shape shown inside each of the forms indicates the total certainty factor. Since all values of the certainty factors of each of the attributes are the same, the forms indicating the total certainty factor are an equilateral triangle, a regular pentagon, and a perfect circle, respectively. Further, when the total certainty factor is 1, the form indicating the total certainty factor matches the outermost solid line of each of the forms. For example, the user designates an arbitrary position inside the form, and thus the total certainty factor may be determined.

FIG. 6 shows that a total certainty factor is changed from 0.8 to 0.6 by operating to move inward any point on a side of each of forms, excluding vertices. A dotted line shown inside each of the forms in FIG. 6 indicates a total certainty factor before change, and a solid line shown further inside the dotted line indicates a total certainty factor after change. FIG. 6 shows that the certainty factors of all attributes are changed to 0.6.

FIG. 7 shows that a certainty factor of individual attributes is changed by operating to move inward a vertex of each of forms. For example, in the form of triangle, it is shown that only a certainty factor of an attribute as an age of thirties is changed from 0.8 to 0.6 by moving a vertex associated with the attribute of the age of thirties. Furthermore, in the form of pentagon, it is shown that only a certainty factor that the clothing color is red is changed from 0.8 to 0.6 by moving a vertex associated with red as the clothing color. Furthermore, in the form of circle, it is shown that only a certainty factor that the clothing color is red is changed from 0.8 to 0.6 by moving a point on the circumference associated with red as the clothing color. In each of the forms, certainty factors of two or more attributes may be changed. In this way, the total certainty factor may be set in the form of polygon or circle, and the certainty factor of individual attributes may be adjusted.

Next, score calculation processing executed by the calculation unit 12 will be described. The calculation unit 12 calculates a score of each person managed by the management unit 11 using Formula 1 below.

$$S(h)=\Sigma_{j=1}^{m} p_j^q \times p_j^h \times \mathrm{Sim}(f_j^q, f_j^h) \quad (1)$$

$p_j^q$: a certainty factor of a j-th attribute of a search condition (query condition)

$p_j^h$: a certainty factor of a j-th attribute of a search target $\mathrm{Sim}(f_j^q, f_j^h)$: similarity between the j-th attribute of the search condition and the j-th attribute of the search target The j-th attribute of the search condition is, for example, an attribute set for the j-th category displayed in the search condition designating region 32 in FIG. 4. In FIG. 4, counting is sequentially performed from the category displayed on the top. In FIG. 4, for example, a male set for a first category is a first attribute, and an age in thirties set for a second category is a second attribute.

The j-th attribute of the search target is, for example, an attribute set for the j-th category shown in the database in FIG. 3. In FIG. 3, counting is sequentially performed from the category shown on the left, excluding the person. In FIG. 3, for example, the attribute set for the category of gender is a first attribute, an attribute set for the category of age is a second attribute, an attribute set for the category of clothing color is a third attribute, and an attribute set for the category of eyeglasses is a fourth attribute.

The sequence of the categories displayed in the search condition designating region in FIG. 4 and the sequence of the categories shown in the database in FIG. 3 may be predetermined such that the same categories are set in the same sequence. In other words, the first category displayed in the search condition designating region in FIG. 4 and the first category excluding the category of person shown in the database in FIG. 3 may be predetermined as the category of gender.

For $\mathrm{Sim}(f_j^q, f_j^h)$, for example, an existing similarity function may be used, or it may be predefined by the user. For example, as in Sim(male, male)=1.0, Sim(red, dark red)=0.95, Sim(red, deep red)=0.70, similarity values may be set for all combinations of all attributes that can be set in the same category. 1.0 set as similarity indicates that the attributes match, and the similarity between two attributes decreases as the value decreases from 1.0.

In addition, for $\mathrm{Sim}(f_j^q, f_j^h)$, the similarity between the j-th attribute of the search condition and the j-th attribute of the search target is calculated, and the similarity between attributes set in different categories may not be calculated. In other words, the similarity such as Sim(male, deep blue) is not calculated. Alternatively, the similarity between attributes set in different categories may be set to be a low value. Further, when two attributes clearly have no similarity even if such attributes can be set in the same category, the similarity may not be calculated. For example, for Sim (thirties, fifties), similarity need not be calculated. Alternatively, the similarity between two attributes, which can be set in the same category but clearly have no similarity, may be set to be a low value.

In the search condition designating region 32 in FIG. 4, for example, it is assumed that (male, 0.9), (thirties, 0.8), (forties, 0.2), and (red, 0.7) are input as search conditions. In the parenthesis, the left side indicates the attribute, and the right side indicates the certainty factor. In FIG. 4, for example, only the age in thirties is designated in the category of age, but a plurality of generations may be set.

In this case, the scores of the persons h_1 to h_4 managed in FIG. 3 are calculated as follows.

$S(h_1)$=0.9×0.7×Sim(male, male)+0.8×0.8×Sim(thirties, thirties)+0.7×0.9×Sim(red, dark red)=0.9× 0.7×1.0+0.8×0.8×1.0+0.7×0.9×0.95=1.8685

$S(h_2)$=0.9×0.9×Sim(male, female)+0.8×0.6×Sim(thirties, thirties)+0.7×0.9×Sim(red, deep red)=0.9× 0.9×0.0+0.8×0.6×1.0+0.7×0.9×0.7=0.921

$S(h_3)$=0.9×0.9×Sim(male, male)+0.2×0.8×Sim(forties, forties)+0.7×0.7×Sim(red, nut brown)=0.9× 0.9×1.0+0.2×0.8×1.0+0.7×0.7×0.8=1.362

$S(h_4)$=0.9×0.8×Sim(male, male)+0.7×0.6×Sim(red, deep blue)=0.9×0.8×1.0+0.7×0.6×0.0=0.72

The scores of the persons h_1 to h_4 are h_1, h_3, h_2, and h_4 in descending order of score. Accordingly, the display unit 13 displays h_1, h_3, h_2, and h_4 in the result display region 34 in this order.

Subsequently, a flow of display processing of the search results according to the second example embodiment will be described with reference to FIG. 8. Here, it is assumed that, before the start of the flow of display processing of the search results shown in FIG. 8, the management unit 11 specifies the attributes of the plurality of persons displayed in the video data taken by the surveillance camera and the certainty factors of the attributes. For example, the management unit 11 may acquire video data taken by the surveillance camera, and execute image analysis on the acquired video data, or the like, to specify attributes of a plurality of persons displayed in the video data and certainty factors of the attributes. Alternatively, the management unit 11 may receive, via a network or the like, attributes of a plurality of persons displayed in video data specified by another apparatus and certainty factors of the attributes. For example, the surveillance camera may specify attributes of a plurality of persons displayed in video data and certainty factors of the attribute. In this case, the management unit 11 may receive the video data, the attributes, and the certainty factors from the surveillance camera via the network.

First, the search condition acquisition unit 21 acquires search conditions (S21). Specifically, the search condition acquisition unit 21 acquires, as search conditions, an attribute about the search target and a certainty factor indicating a probability of being the attribute. The search condition acquisition unit 21 may acquire search condition input via an interface by the user of the information processing apparatus 20, or may acquire an attribute and a certainty factor of a person as a search target specified by analysis of an image on which the person as the search target is displayed. For example, the image, on which the person as the search target is displayed, may be designated or input by the user of the information processing apparatus 20.

Next, the calculation unit 12 calculates a score of the search object using the attribute and the certainty factor included in the search conditions (S22). Specifically, the calculation unit 12 calculates a score of each of persons using the attribute and the certainty factor included in the search conditions and the attribute and the certainty factor associated with each of the persons managed by the management unit 11.

Next, the display unit 13 determines an object to be displayed, based on the score calculated by the calculation unit 12 (S23). For example, when the number of persons to be displayed is predetermined, the display unit 13 selects a predetermined number of persons in descending order of score for persons. Alternatively, the display unit 13 may select a person having a score higher than a predetermined score.

Next, the display unit 13 displays the selected objects (S24). Specifically, the display unit 13 displays images of the persons selected based on the scores in the result display region 34. Further, the search condition acquisition unit 21 may newly set, as search conditions, the attribute associated with the person designated or selected by the user among the persons displayed in the result display region 34 and the certainty factor of the attribute, and may execute processing subsequent to step S21.

In addition, search results of the search may be displayed in the result display region 34, the search being executed based on the certainty factor for each of the attributes of the persons designated as the search conditions and the attribute of the person appearing in the image managed by the management unit 11.

As described above, the information processing apparatus 20 according to the second example embodiment calculates the score of each of the persons, using the attribute and the certainty factor of each of the person managed by the search condition and the management unit 11. The information processing apparatus 20 specifies the person to be displayed in the result display region 34, based on the score. The information processing apparatus 20 calculates a higher score as the certainty factor of the attribute managed by the management unit 11 increases. Furthermore, the information processing apparatus 20 calculates a higher score as the similarity between the attribute input as the search condition and the attribute managed by the management unit 11 increases. Thus, the information processing apparatus 20 can preferentially display the person whose matching degree with the search condition is high, in the result display region 34.

Third Example Embodiment

Subsequently, a description will be given with respect to a flow of display processing of a search condition designating region 32 according to a third example embodiment with reference to FIG. 9. The user using the information processing apparatus 20 may confirm the search results displayed in the result display region 34 by repeatedly changing the certainty factor of the attribute that is the search condition. For example, the user may confirm the search results displayed in the result display region 34 together with a person who witnessed a suspicious person, and may search for an image on which the suspicious person appears. In such a case, when the suspicious person remembered by the person who witnessed the suspicious person is not displayed in the search results, the user may change the search results displayed in the result display region 34 by repeatedly changing the certainty factor of the attribute that is the search condition.

Figure 9:
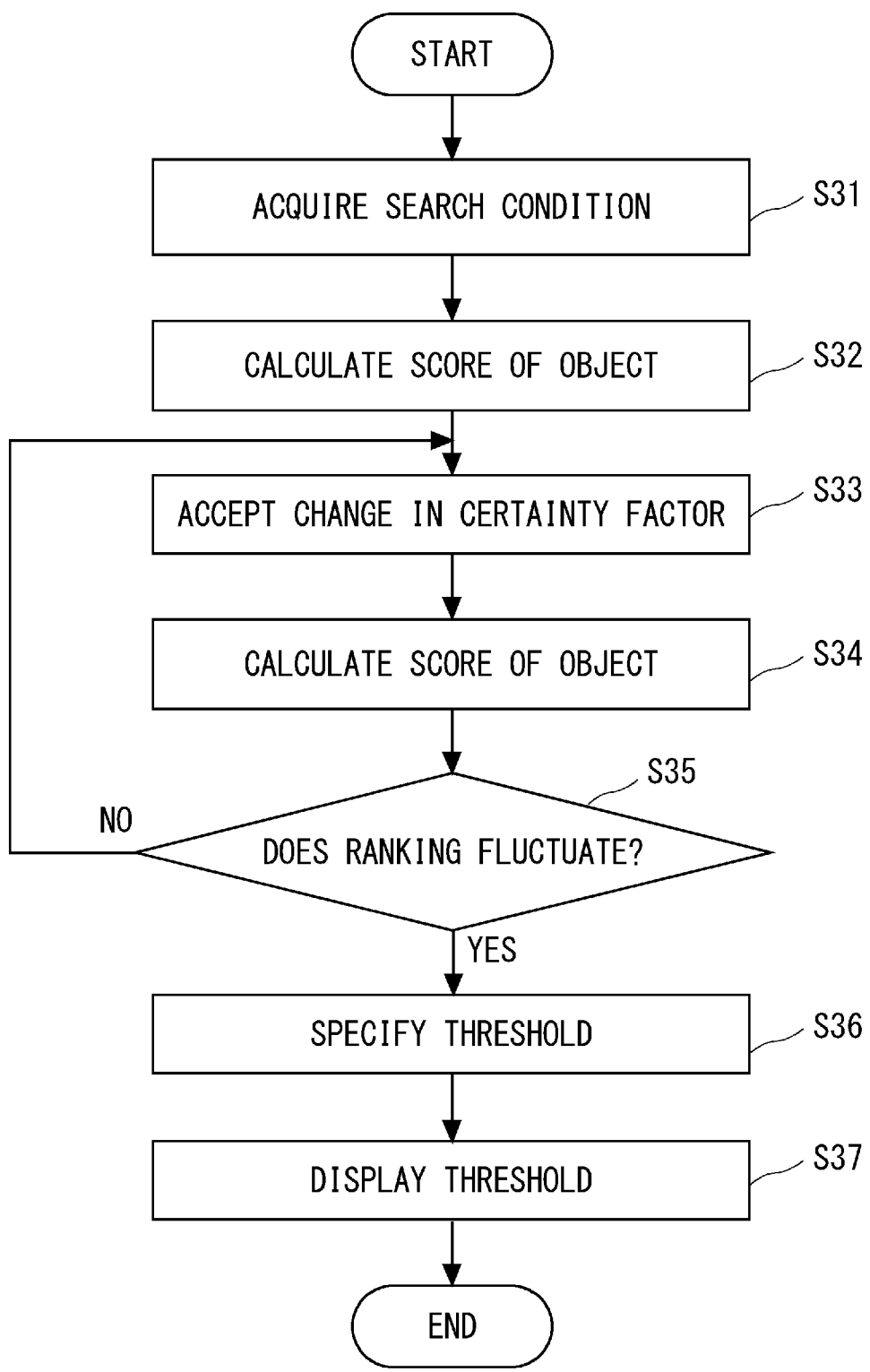
FIG. 9 is a flowchart showing a flow of display processing of a search condition designating region according to the second example embodiment.

The flow of the display processing of the search condition designating region 32 shown in FIG. 9 is executed to enable a reduction in the number of changes in the certainty factor and an efficient search for a person as a search target.

Figure 8:
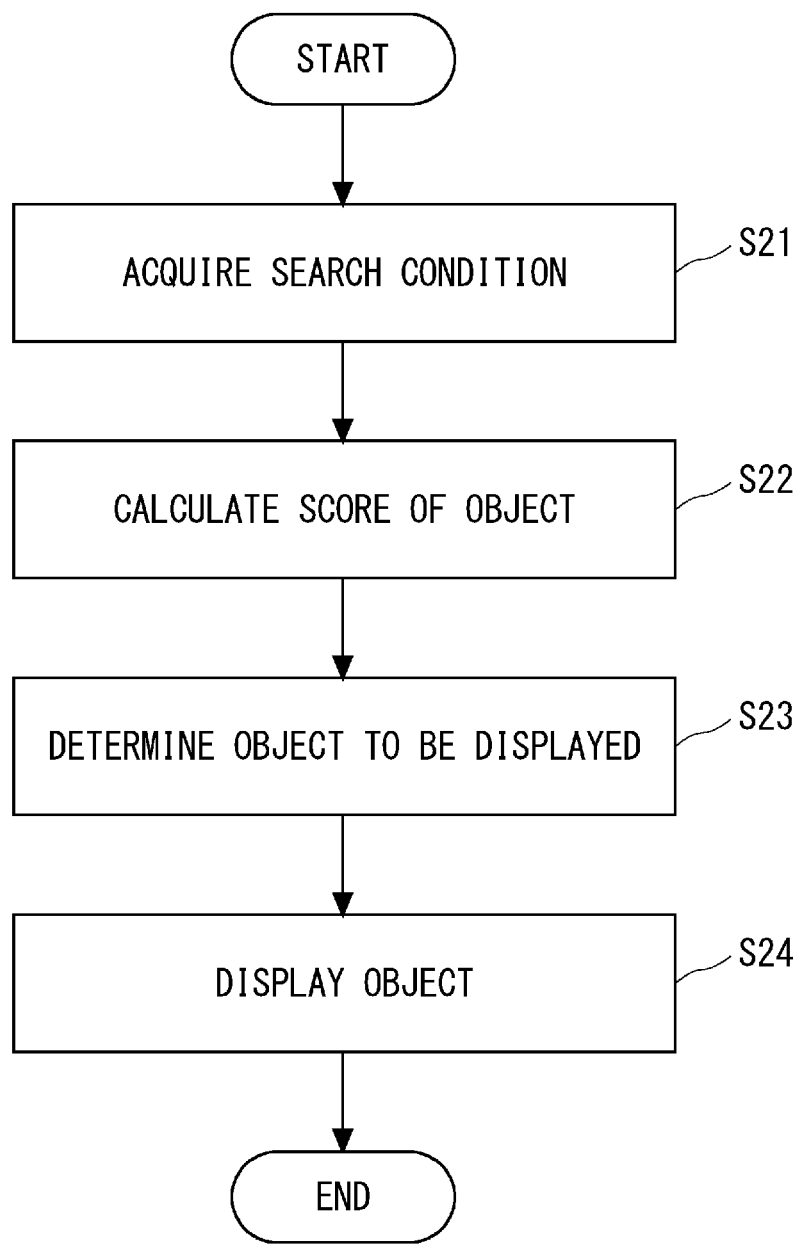
FIG. 8 is a flowchart showing a flow of display processing of search results according to the second example embodiment.

Steps S31 and S32 in FIG. 9 are the same as steps S21 and S22 in FIG. 8, and thus will not be described in detail. Next, the calculation unit 12 accepts a change in certainty factor (S33). In other words, the calculation unit 12 acquires a certainty factor different in value from the certainty factor included in the search condition used to calculate the score in step S32.

Next, the calculation unit 12 calculates a score of the object using the changed certainty factor (S34). Specifically, the calculation unit 12 calculates a score of each of the persons managed by the management unit 11 using the changed certainty factor.

Next, the calculation unit 12 compares a ranking based on the score calculated in step S32 with a ranking based on the score calculated in step S34, and determines whether the ranking fluctuates (S35). When determining that the ranking does not fluctuate, the calculation unit 12 repeats processing subsequent to step S33. Here, the calculation unit 12 may, for example, increase the value of the certainty factor by a predetermined increment when repeating the processing of step S33. For example, when a decimal from 0 to 1 is used as the certainty factor, the calculation unit 12 may increase or decrease the certainty factor by 0.1 each time the processing of step S33 is repeated. In this way, the calculation unit 12 repeats the change of the certainty factor until the ranking fluctuate due to the fluctuation of the score.

Figure 10:
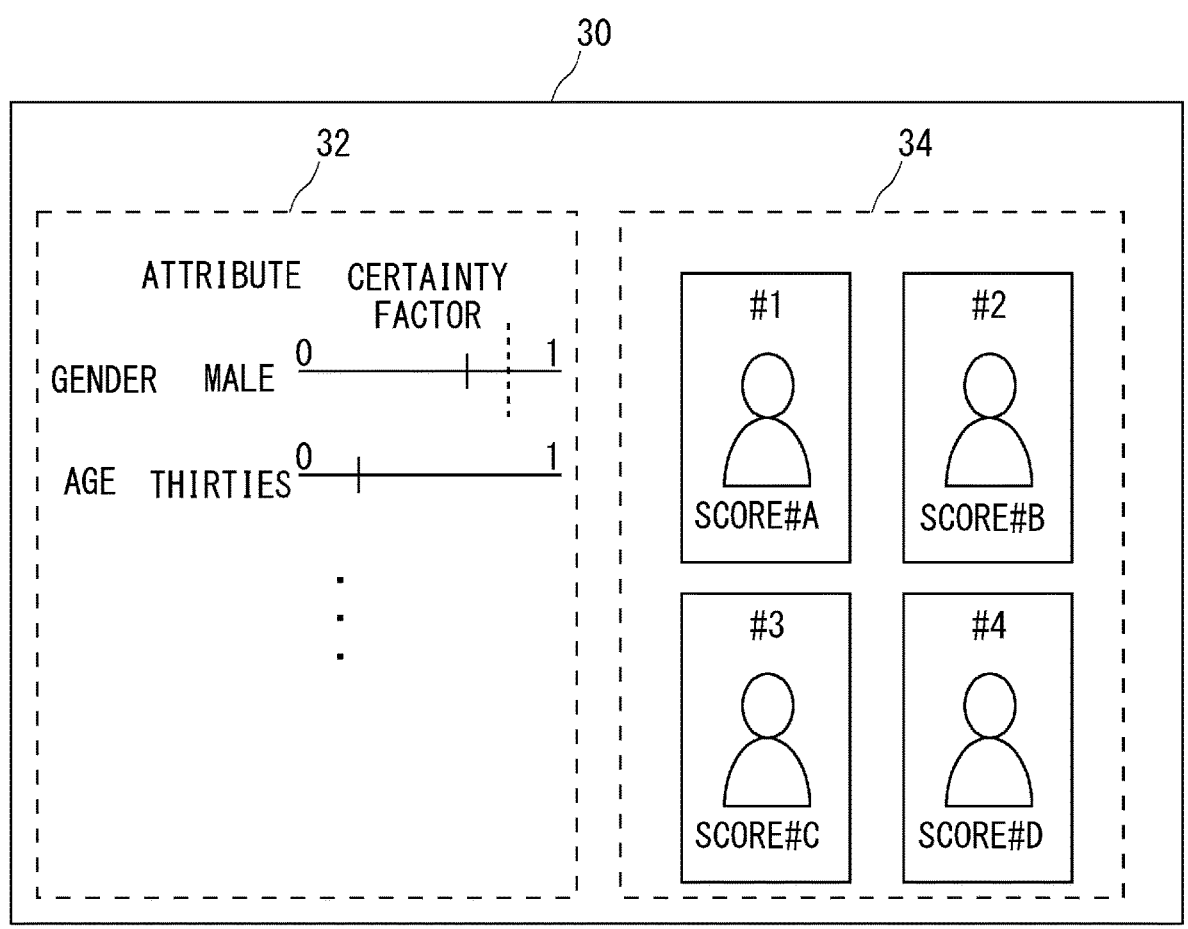
FIG. 10 is a diagram of a screen image displayed by the display unit according to the second example embodiment.

When determining in step S35 that the ranking fluctuated, the calculation unit 12 specifies the value of the certainty factor after the change in step S33, as a threshold (S36). Next, the display unit 13 displays the threshold in the search condition designating region 32 (S37). For example, the display unit 13 may indicate the threshold value using a vertical dotted line as indicated by a slide bar of the certainty factor associated with the category of gender in the search condition designating region 32 in FIG. 10. Further, FIG. 10 shows a threshold when the input certainty factor is increased, but the display unit 13 may specify and display the threshold even when input certainty factor is decreased. The calculation unit 12 may specify threshold of a plurality of certainty factors. In such a case, the display unit 13 displays a plurality of threshold in the search condition designating region 32. Specifically, the display unit 13 may display both the threshold when the input certainty factor is increased and the threshold when the input certainty factor is decreased on the slide bar of the certainty factor in the search condition designating region 32. Furthermore, the calculation unit 12 may specify the threshold of a certain attribute in step S36, for example, the threshold of the certainty factor associated with the category of gender, and then may specify the threshold of the certainty factor associated with the category of age. In other words, the calculation unit 12 may specify a value of a certainty factor that is a threshold for two or more attributes among the attribute included in the search condition.

Further, the search condition acquisition unit 21 may newly set an attribute associated with a person designated by the user among the persons displayed in the search condition designating region 32 and a certainty factor of the attribute, as search conditions.

As described above, the display unit 13 displays the threshold of the certainty factor, and thus the user of the information processing apparatus 20 can efficiently change the certainty factor when repeatedly changing the certainty factor of the attribute that is the search condition. In other words, the user can confirm the threshold displayed in the search condition designating region 32 to grasp the value of the certainty factor at which the ranking fluctuates. Therefore, the user does not need to change the certainty factor within a range in which the ranking does not fluctuate, and thus the number of times of change in the certainty factor of the attribute can be reduced.

Figure 11:
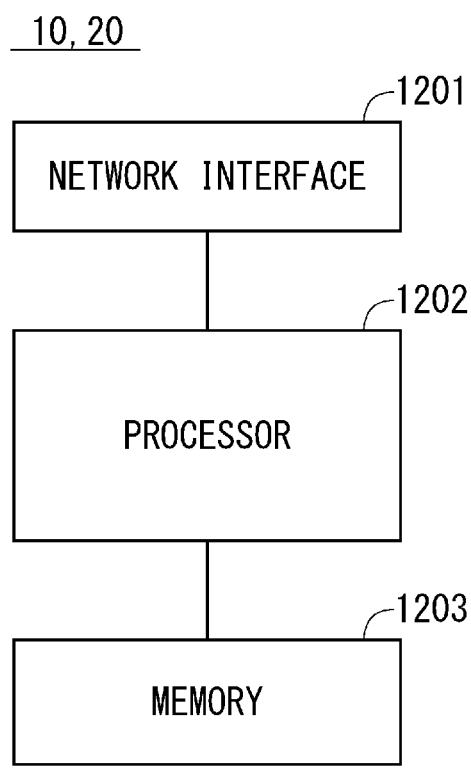
FIG. 11 is a configuration diagram of the information processing apparatus according to each of the example embodiments.

FIG. 11 is a block diagram showing a configuration example of the information processing apparatus 10 and the information processing apparatus 20 (hereinafter, referred to as information processing apparatus 10 and the like). Referring to FIG. 11, the information processing apparatus 10 and the like includes a network interface 1201, a processor 1202, and a memory 1203. The network interface 1201 may be used to communicate with network nodes (e.g., eNB, MME, P-GW). The network interface 1201 may include, for example, a network interface card (NIC) conforming to the IEEE 802.3 series. Here, the eNB represents evolved Node B, the MME represents Mobility Management Entity, and the P-GW represents Packet Data Network Gateway. The IEEE represents Institute of Electrical and Electronics Engineers.

The processor 1202 reads and runs software (computer program) from the memory 1203 and thereby executes processing of the information processing apparatus 10, and the like described with reference to the flowcharts in the example embodiments described above. The processor 1202 may be a microprocessor, an MPU or a CPU, for example. The processor 1202 may include a plurality of processors.

The memory 1203 is a combination of a volatile memory and a nonvolatile memory. The memory 1203 may include a storage that is placed apart from the processor 1202. In this case, the processor 1202 may access the memory 1203 via an I/O (Input/Output) interface, which is not shown.

In the example of FIG. 11, the memory 1203 is used to store a group of software modules. The processor 1202 reads and runs the group of software modules from the memory 1203 and can thereby perform the processing of the information processing apparatus 10 and the like described in the above example embodiments.

As described with reference to FIG. 11, each of processors that the information processing apparatus 10 and the like includes, runs one or a plurality of programs including a group of instructions for causing a computer to perform the algorithms described using the drawings.

In the above-described examples, the program includes a group of instructions (or software codes) that, when loaded into a computer, causes a computer to perform one or more functions described in the example embodiments. The program may be stored in a non-transitory computer-readable medium or a tangible storage medium. Examples of computer-readable media or tangible storage media may include, not for limitation, a random-access memory (RAM), a read-only memory (ROM), a flash memory, a solid-state drive (SSD) or other memory technology, a CD-ROM, a digital versatile disc (DVD), a Blu-ray (registered trademark) disc or other optical disk storages, a magnetic cassette, a magnetic tape, and a magnetic disk storage or other magnetic storage devices. The program may be transmitted on a transitory computer-readable medium or a communication medium. Examples of transitory computer-readable media or communication media includes, not for limitation, electric signals, optical signals, acoustic signals, or other forms of propagated signals.

The present disclosure is not limited to the above-described example embodiments, and can be modified as appropriate without departing from the scope and spirit of the disclosure.

Some or all the above-described example embodiments may also be described as in the following Supplementary Notes, but are not limited to the following.

Supplementary Note 1

An information processing apparatus comprising:
a management unit that manages at least one object, an attribute by which the object is classified, and a certainty factor indicating a probability that the object has the attribute in association with each other;

a calculation unit that, using a certainty factor of an attribute designated as a search condition and a certainty factor being managed in association with an attribute identical or similar to the attribute designated as the search condition, calculates a score indicating a matching degree of the object with the search condition; and a display unit that displays the object based on the calculated score.

Supplementary Note 2

In the information processing apparatus according to Supplementary Note 1, the display unit displays the object in descending order of the score.

Supplementary Note 3

In the information processing apparatus according to Supplementary Note 1 or 2, the display unit displays a search condition designating region in which the search condition is displayed and a result display region in which the object is displayed.

Supplementary Note 4

In the information processing apparatus according to Supplementary Note 3, the display unit displays, on the same screen, the search condition designating region in which the search condition is displayed and the result display region in which the object is displayed.

Supplementary Note 5

In the information processing apparatus according to any one of Supplementary Notes 1 to 4, the calculation unit calculates a higher score as the certainty factor being managed in association with the attribute identical or similar to the attribute designated as the search condition increases.

Supplementary Note 6

In the information processing apparatus according to any one of Supplementary Notes 1 to 5, the calculation unit calculates a higher score as similarity between attributes similar to the attribute designated as the search condition increases.

Supplementary Note 7

In the information processing apparatus according to any one of Supplementary Notes 1 to 6, the information processing apparatus further includes an image analysis unit that analyzes an image to specify an attribute of a person included in the image and a certainty factor of the attribute, and the calculation unit uses, as the search condition, the attribute of the person and the certainty factor of the attribute which were specified.

Supplementary Note 8

In the information processing apparatus according to any one of Supplementary Notes 1 to 7, the calculation unit changes a value of the certainty factor of the attribute designated as the search condition, recalculates the score, and specifies, as a threshold, a value of the certainty factor after change when a ranking of two or more scores of the object before changing the value of the certainty factor of the attribute designated as the search condition fluctuated due to recalculation of the score, and the display unit displays the threshold along with the certainty factor of the attribute designated as the search condition.

Supplementary Note 9

In the information processing apparatus according to Supplementary Note 8, the calculation unit changes the value of the certainty factor of the attribute designated as the search condition, recalculates the score, and changes the value of the certainty factor of the attribute designated as the search condition until the ranking fluctuates when a ranking of two or more scores of the object before changing the value of the certainty factor of the attribute designated as the search condition does not fluctuate due to recalculation of the score.

Supplementary Note 10

An information processing apparatus comprising:

management means for managing at least one captured image of a person;

accepting means for accepting, for each attribute of a person as a search condition, designation of a certainty factor indicating likelihood of being the attribute;

search means for executing a search for the image based on the designated certainty factor and the attribute of the person appearing in the image; and display means for displaying the image based on a result of the search.

Supplementary Note 11

A display method comprising:

managing at least one object, an attribute by which the object is classified, and a certainty factor indicating a probability that the object has the attribute in association with each other;

using a certainty factor of an attribute designated as a search condition and a certainty factor being managed in association with an attribute identical or similar to the attribute designated as the search condition, thereby calculating a score indicating a matching degree of the object with the search condition; and displaying the object based on the calculated score.

Supplementary Note 12

A non-transitory computer-readable medium storing a program that causes a computer to execute:

managing at least one object, an attribute by which the object is classified, and a certainty factor indicating a probability that the object has the attribute in association with each other;

using a certainty factor of an attribute designated as a search condition and a certainty factor being managed in association with an attribute identical or similar to the attribute designated as the search condition, thereby calculating a score indicating a matching degree of the object with the search condition; and displaying the object based on the calculated score.

REFERENCE SIGNS LIST

10 INFORMATION PROCESSING APPARATUS
11 MANAGEMENT UNIT
12 CALCULATION UNIT
13 DISPLAY UNIT
20 INFORMATION PROCESSING APPARATUS
21 SEARCH CONDITION ACQUISITION UNIT
30 DISPLAY SCREEN
32 SEARCH CONDITION DESIGNATING REGION
34 RESULT DISPLAY REGION

What is claimed is:

1. An information processing apparatus comprising:
at least one memory storing instructions, and
at least one processor configured to execute the instructions to:
manage at least one object, an attribute by which the at least one object is classified, and a certainty factor indicating a probability that the at least one object has the attribute in association with each other;
acquire a search condition that designates an attribute about a search target and a certainty factor indicating a probability that the search target has the attribute;
calculate a score indicating a matching degree of the at least one object with the search condition according to $\Sigma_{j=1}^{m} p_j^q \times p_j^h \times \text{Sim}(f_j^q, f_j^h)$, where j is the index of the summation $\Sigma$, m is a total number of attributes, q is a number of attributes designated as the search condition, h is a number of attributes in association with the at least one object, $p_j^q$ is the certainty factor of the attribute designated as the search condition, $p_j^h$ is a certainty factor of the at least one object having an attribute identical or similar to the attribute designated as the search condition, and $\text{Sim}(f_j^q, f_j^h)$ is a similarity value between the attribute designated as the search condition ($f_j^q$) and the attribute identical or similar to the attribute designated as the search condition ($f_j^h$),
wherein the attribute designated as the search condition and the attribute identical or similar to the attribute designated as the search condition are set in a same category; and
display the at least one object as the search target based on the calculated score.

2. The information processing apparatus according to claim 1, wherein the at least one processor is further configured to execute the instructions to display the at least one object in descending order of scores.

3. The information processing apparatus according to claim 1, wherein the at least one processor is further configured to execute the instructions to display a search condition designating region in which the search condition is displayed and a result display region in which the at least one object is displayed.

4. The information processing apparatus according to claim 3, wherein the at least one processor is further configured to execute the instructions to display, on the same screen, the search condition designating region in which the search condition is displayed and the result display region in which the at least one object is displayed.

5. The information processing apparatus according to claim 1, wherein the at least one processor is further configured to execute the instructions to calculate a higher score as the certainty factor of the at least one object having the attribute identical or similar to the attribute designated as the search condition increases.

6. The information processing apparatus according to claim 1, wherein the at least one processor is further configured to execute the instructions to calculate a higher score as similarity between the attribute designated as the search condition and the attribute identical or similar to the attribute designated as the search condition increases.

7. The information processing apparatus according to claim 1, wherein the at least one processor is further configured to execute the instructions to:
analyze an image to specify an attribute of a person included in the image and a certainty factor of the attribute; and
use, as the search condition, the attribute of the person and the certainty factor of the attribute which were specified.

8. The information processing apparatus according to claim 1, wherein the at least one processor is further configured to execute the instructions to:
change a value of the certainty factor of the attribute designated as the search condition, recalculate the score, and specify, as a threshold, the value of the certainty factor of the attribute designated as the search condition after changing the value of the certainty factor of the attribute designated as the search condition in a case where a ranking of two or more scores of the at least one object before changing the value of the certainty factor of the attribute designated as the search condition fluctuated due to recalculation of the score; and
display the threshold along with the certainty factor of the attribute designated as the search condition.

9. The information processing apparatus according to claim 8, wherein the at least one processor is further configured to execute the instructions to:
change the value of the certainty factor of the attribute designated as the search condition,
recalculate the score, and based on a ranking of two or more scores of the at least one object before changing the value of the certainty factor of the attribute designated as the search condition not fluctuating in response to the recalculating the score, change the value of the certainty factor of the attribute designated as the search condition until the ranking fluctuates.

10. A display method comprising:
managing at least one object, an attribute by which the at least one object is classified, and a certainty factor indicating a probability that the at least one object has the attribute in association with each other;
acquiring a search condition that designates an attribute about a search target and a certainty factor indicating a probability that the search target has the attribute;
calculating a score indicating a matching degree of the at least one object with the search condition according to $\Sigma_{j=1}^{m} p_j^q \times p_j^h \times \text{Sim}(f_j^q, f_j^h)$, where j is the index of the summation $\Sigma$, m is a total number of attributes, q is a number of attributes designated as the search condition, h is a number of attributes in association with the at least one object, $p_j^q$ is the certainty factor of the attribute designated as the search condition, $p_j^h$ is a certainty factor of the at least one object having an attribute identical or similar to the attribute designated as the search condition, and $\text{Sim}(f_j^q, f_j^h)$ is a similarity value between the attribute designated as the search condition ($f_j^q$) and the attribute identical or similar to the attribute designated as the search condition ($f_j^h$), wherein the attribute designated as the search condition and the attribute identical or similar to the attribute designated as the search condition are set in a same category; and displaying the at least one object as the search target based on the calculated score.

11. A non-transitory computer-readable medium storing a program that causes a computer to execute:

managing at least one object, an attribute by which the at least one object is classified, and a certainty factor indicating a probability that the at least one object has the attribute in association with each other;

acquiring a search condition that designates an attribute about a search target and a certainty factor indicating a probability that the search target has the attribute;

calculating a score indicating a matching degree of the at least one object with the search condition according to $\Sigma_{j=1}^{m} p_j^q \times p_j^h \times \text{Sim}(f_j^q, f_j^h)$, where j is the index of the summation $\Sigma$, m is a total number of attributes, q is a number of attributes designated as the search condition, h is a number of attributes in association with the at least one object, $p_j^q$ is the certainty factor of the attribute designated as the search condition, $p_j^h$ is a certainty factor of the at least one object having an attribute identical or similar to the attribute designated as the search condition, and $\text{Sim}(f_j^q, f_j^h)$ is a similarity value between the attribute designated as the search condition ($f_j^q$) and the attribute identical or similar to the attribute designated as the search condition ($f_j^h$), wherein the attribute designated as the search condition and the attribute identical or similar to the attribute designated as the search condition are set in a same category; and displaying the at least one object as the search target based on the calculated score.

* * * * *